US012585560B2

(12) United States Patent
Lyu

(10) Patent No.: US 12,585,560 B2
(45) Date of Patent: Mar. 24, 2026

(54) REFINING PARAMETER SETTINGS FOR COPY SERVICES

(71) Applicant: International Business Machines Corporation, Armonk, NY (US)

(72) Inventor: Gang Lyu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 18/605,483

(22) Filed: Mar. 14, 2024

(65) Prior Publication Data

US 2025/0291690 A1 Sep. 18, 2025

(51) Int. Cl.
 *G06F 11/00* (2006.01)
 *G06F 11/07* (2006.01)
 *G06F 11/22* (2006.01)
(52) U.S. Cl.
 CPC ...... *G06F 11/2289* (2013.01); *G06F 11/0709* (2013.01); *G06F 11/0793* (2013.01)
(58) Field of Classification Search
 CPC ............. G06F 11/2289; G06F 11/0709; G06F 11/0793; G06F 11/3006; G06F 11/3051; G06F 11/3093; G06F 11/2069
 See application file for complete search history.

(56) References Cited

U.S. PATENT DOCUMENTS

| | | | |
|---|---|---|---|
| 8,838,510 B2 | 9/2014 | Baughman et al. | |
| 10,409,699 B1 * | 9/2019 | Aithal .................... | G06F 11/00 |

FOREIGN PATENT DOCUMENTS

| | | |
|---|---|---|
| CN | 102184746 A | 9/2011 |
| CN | 103810104 B | 8/2017 |
| CN | 105946858 B | 2/2019 |

OTHER PUBLICATIONS

Guo et al., "A Genetic Algorithm for Optimized Feature Selection with Resource Constraints in Software Product Lines," Preprint, Journal of Systems and Software, Feb. 21, 2011, pp. 1-18.

(Continued)

*Primary Examiner* — Katherine Lin
(74) *Attorney, Agent, or Firm* — Zilka-Kotab, P.C.

(57) ABSTRACT

A computer-implemented method (CIM), according to one embodiment, includes defining a fitness function for testing different configurations in a distributed site environment, and generating a configuration table that includes all possible configurations of a system in a test environment. The method further includes performing a testing process for each of the configurations. The testing process includes initializing a population of a plurality of individuals. The testing process further includes using the fitness function to evaluate a fitness of each of the individuals, selecting a subset of the individuals to be in a parent group, creating new individuals by combining information from multiple individuals in the parent group, and storing refined parameters of the configuration, that are determined to be optimal, to a configuration parameter table. A production machine is caused to tune to the refined parameters of the configuration parameter table for operations performed within the distributed site environment.

20 Claims, 5 Drawing Sheets

(56) References Cited

OTHER PUBLICATIONS

Bezerra et al., "Automatic Configuration of Multi-objective Optimizers and Multi-objective Configuration," IRIDIA—Technical Report Series, Report No. TR/IRIDIA/2017-011, Nov. 2017, 28 pages.

Zadok et al., "Parametric Optimization of Storage Systems," 7th USENIX Workshop on Hot Topics in Storage and File Systems, Jul. 2015, pp. 1-5, retrieved from https://www.usenix.org/system/files/conference/hotstorage15/hotstorage15-zadok.pdf.

Jin et al., "Parameter optimization of software reliability growth model withS-shaped testing-effort function using improved swarm intelligentoptimization," Applied Soft Computing, vol. 40, 2016, pp. 283-291.

Aleti et al., "Test Data Generation with a Kalman Filter-Based Adaptive Genetic Algorithm," Preprint, Journal of Systems and Software, Oct. 4, 2014, pp. 1-23.

* cited by examiner

100

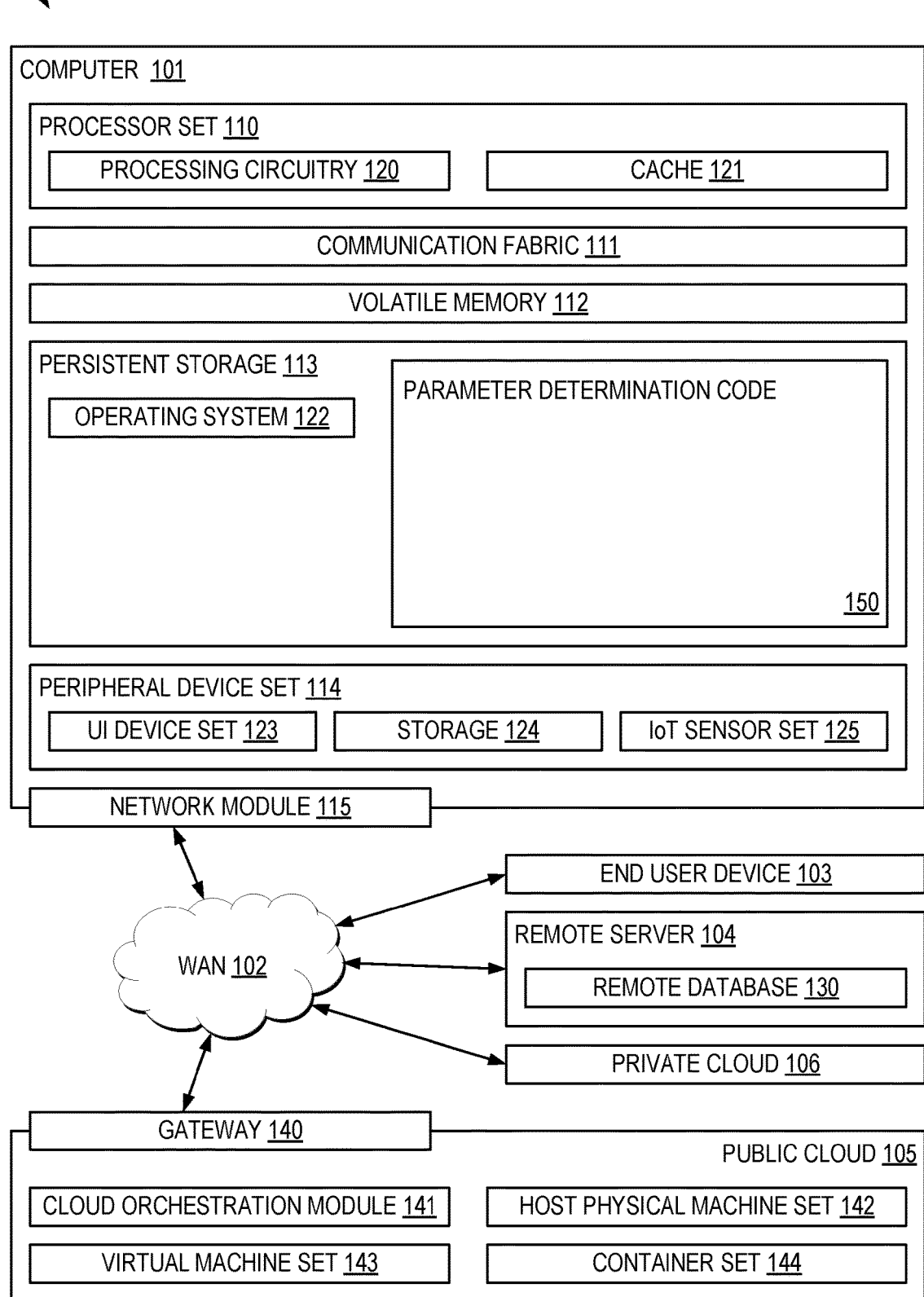

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

PARAMETER DETERMINATION CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

200

202 — Define a fitness function for testing different configurations in a distributed site environment 204 — Generate a configuration table that includes all possible configurations of a system in a test environment 206 — Configuration table empty?

YES → 208 — Cause the configuration parameter table to be deployed to production

NO

210 — Perform a testing process for each of the configurations of the configuration table 212 — Record the parameters in a configuration parameter table

FIG. 2A

300 pprcTaskTimeout value is 0 (0x0) [addr = 0xf1000c2fa2efd330]
pprcGCTaskTimeout value is 0 (0x0) [addr = 0xf1000c2fa2efd334]
pprcCascTaskTimeout value is 0 (0x0) [addr = 0xf1000c2fa2efd338]
csmgrATTMaxTransferGroupSize value is 32 (0x20) [addr = 0xf1000c2fa38c7b80]
csAxdcMasterPollingExitPerc value is 100 (0x64) [addr = 0xf1000c2fa38c7b84]
csmgrSyncGrpLowPriorRankLim value is 16 (0x10) [addr = 0xf1000c2fa38c7c74]
csmgrSyncGrpRankLim value is 42 (0x2a) [addr = 0xf1000c2fa38c7c70]
csmgrSyncGrpDaLim value is 64 (0x40) [addr = 0xf1000c2fa38c7c6c]
fbPprcMaxLoTcbUsage value is 2048 (0x800) [addr = 0xf1000c2fa314b6ec]
CsPpXdAlwaysUseDFW value is 1 (0x1) [addr = 0xf1000c2fa38c7ccc]
csEnableGCPColls value is 1 (0x1) [addr = 0xf1000c2fa38c7cd8]
csChangeRecordingType2Enabled value is 1 (0x1) [addr = 0xf1000c2fa38c7bd0]
csMDPrestageSize value is 32 (0x20) [addr = 0xf1000c2fa38c7d00]
GMRandomWorkloadAccelerator value is 0 (0x0) [addr = 0xf1000c2fa38c7b5c]
fbPprcPortBWCeiling value is 24576 (0x6000) [addr = 0xf1000c2fa313cdec]
csEsePoolOFSValue value is 97 (0x61) [addr = 0xf1000c2fa38c7cfc]
csEsePoolOverThresholdValue value is 85 (0x55) [addr = 0xf1000c2fa38c7cf8]
...

| Configuration arguments | Bandwidth of PPRC paths | Volume size | Disk type |
|---|---|---|---|
| Configuration 1 | 16 G | 10 G | 15 K DDM |
| Configuration 2 | 32 G | 20 G | High performance SSD |

| Configuration arguments | Bandwidth of PPRC paths | Volume size | Disk type | csmgrSyncGrpLow PriorRankLim | csmgrSyncGrp RankLim | fbPprcPortBWCeiling |
|---|---|---|---|---|---|---|
| Configuration 1 | 16 G | 10 G | 15 K DDM | 62 | 73 | 2876 |
| Configuration 2 | 32 G | 20 G | High performance SSD | 82 | 95 | 4900 |

FIG. 5

REFINING PARAMETER SETTINGS FOR COPY SERVICES

BACKGROUND

The present invention relates to disaster recovery, and more specifically, this invention relates to parameters configured within an environment in data is copied in order to enable disaster recovery measures.

Disaster recovery within a multi-site data storage environment typically involves storing copies of data at two or more of the different sites. This way, in response to one of the sites failing as a result of a disaster event, a second of the sites is able to act as a failover site to enable continued access to the data.

SUMMARY

A computer-implemented method (CIM), according to one embodiment, includes defining a fitness function for testing different configurations in a distributed site environment, and generating a configuration table that includes all possible configurations of a system in a test environment. The method further includes performing a testing process for each of the configurations of the configuration table. The testing process includes initializing a population of a plurality of individuals, where each of the individuals of the population includes a plurality of random values for a subset of parameters. The testing process further includes using the fitness function to evaluate a fitness of each of the individuals, selecting a subset of the individuals to be in a parent group, creating new individuals by combining information from multiple individuals in the parent group, and storing refined parameters of the configuration, that are determined to be optimal, to a configuration parameter table. A production machine is caused to tune to the refined parameters of the configuration parameter table for operations performed within the distributed site environment.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2A is a flowchart of a method, in accordance with one embodiment of the present invention.

FIG. 3 is a parameter list, in accordance with one embodiment of the present invention.

FIG. 4 is a configuration table, in accordance with one embodiment of the present invention.

FIG. 5 is a configuration parameter table, in accordance with one embodiment of the present invention.

DETAILED DESCRIPTION

Figure 2B:
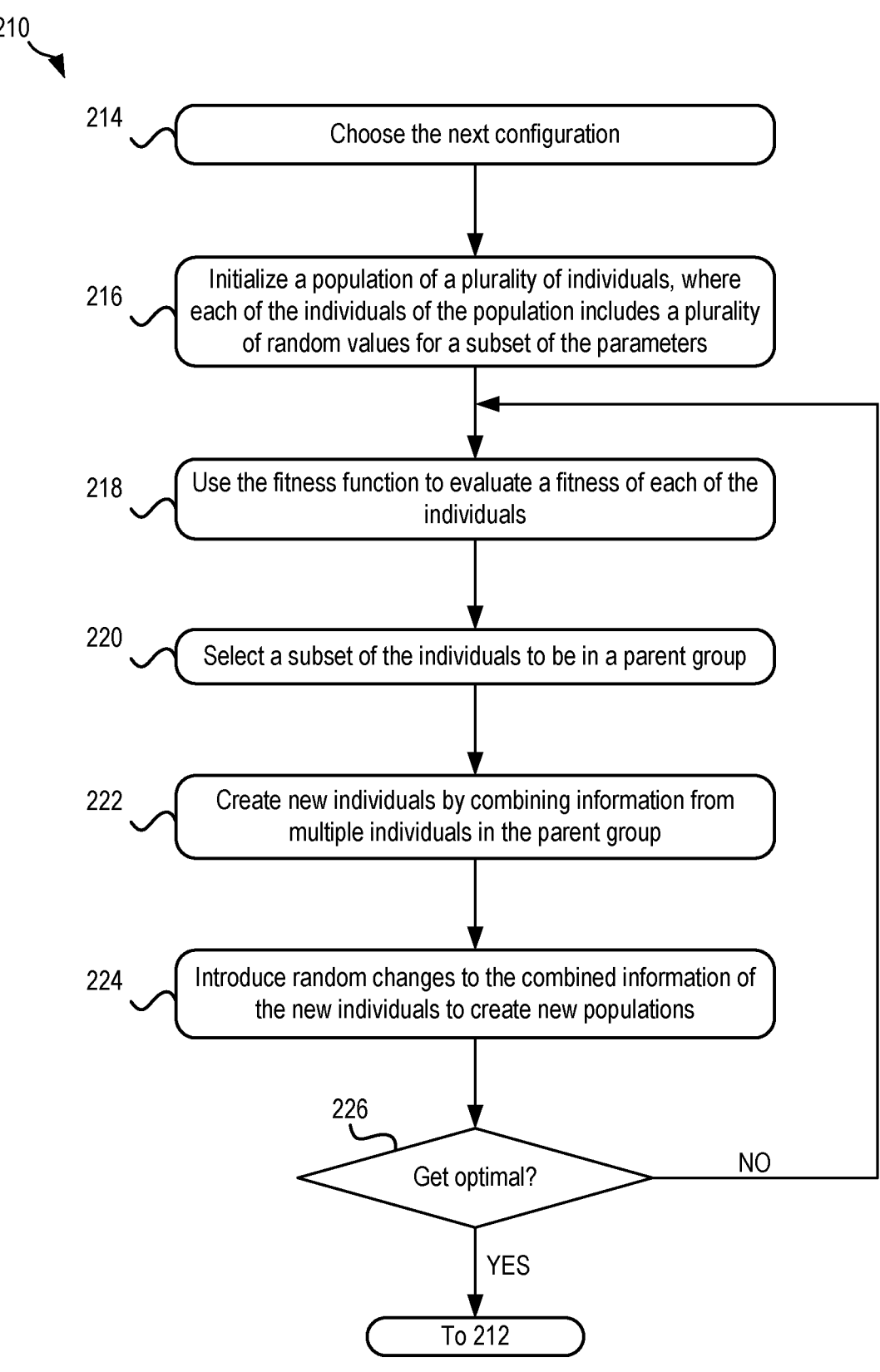
FIG. 2B is a flowchart of sub-operations of an operation of the flowchart of FIG. 2A, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for refining parameter settings for copy services.

In one general embodiment, a CIM includes defining a fitness function for testing different configurations in a distributed site environment, and generating a configuration table that includes all possible configurations of a system in a test environment. The method further includes performing a testing process for each of the configurations of the configuration table. The testing process includes initializing a population of a plurality of individuals, where each of the individuals of the population includes a plurality of random values for a subset of parameters. The testing process further includes using the fitness function to evaluate a fitness of each of the individuals, selecting a subset of the individuals to be in a parent group, creating new individuals by combining information from multiple individuals in the parent group, and storing refined parameters of the configuration, that are determined to be optimal, to a configuration parameter table. A production machine is caused to tune to the refined parameters of the configuration parameter table for operations performed within the distributed site environment.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as parameter determination code of block 150 for refining parameter settings for copy services. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic;

software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, disaster recovery within a multi-site data storage environment typically involves storing copies of data at two or more of the different sites. This way, in response to one of the sites failing as a result of a disaster event, a second of the sites is able to act as a failover site to enable continued access to the data.

Numerous parameters are configured within the environment of copy services and disaster recovery to enable the mirroring of data copies. These parameters can have a mutual impact on one another, and may include a type of parameter that would become apparent to one of ordinary skill in the art after reading the descriptions herein. Illustrative examples of such parameters include, e.g., task timeout values, maximum data transfer group size values, master polling exit percentage values, ranking values, usage values, data recording types, workload accelerator values, data pool thresholds, etc. Parameters within environments in which disaster recovery features conventionally create inefficiencies based on defects in that, as configuration and statuses of systems of the environments change, the parameters need to be ongoingly adjusted to maintain efficient performance. These adjustments potentially only come after at least hundreds of support cases are opened requesting the adjustment of the parameters to solve performance degradation or other issues that worldwide customers of data replication environments experience as a result of disaster events. This is a complex multi-objective optimization problem involving multiple configuration arguments, multiple adjustable parameters, and multiple performance indicators.

In order to mitigate the inefficiencies described above, the techniques embodiments and approaches described herein include constructing a parameter optimization management system to determine the optimal parameter combinations automatically. Furthermore, these techniques integrate a novel genetic method (that includes evaluating different configuration populations) with a software testing process to generate realistic optimal parameter values. This way a novel fitness function is defined to optimize the parameter settings to meet the performance demands of disaster recovery. Furthermore, these techniques include coordinating the multiple composed parameters and resolving conflicts to thereby achieve an overall parameter optimization.

A list of infrastructure terms used in the description and their configuration definitions is provided below.

Controller: Configured to run a method by performing operations of the method. The controller is furthermore configured to send commands to the tester and monitor.

Configurator: Configure a basic configuration of storage servers and copy services according to arguments in a configuration table.

Tester: Call a host server or simulated host server to send a test workload to test performance. The tester may include an automated testing tool(s), depending on the approach.

Monitor: Collect performance indicators or other indicators and send the results to the controller. The monitor may include system monitoring tools.

Host Server or Simulated Host Server: Send the test workload to primary volumes of storage systems.

Storage Server: Storage systems are configured as a copy services environment, like data replication.

Configuration Table: Stores every possible configuration of the systems and environment to be tested.

Configuration Parameter Table: Stores the optimal parameter settings for every configuration of the systems and environment.

Now referring to FIG. 2, a flowchart of a method 200 is shown according to one embodiment. The method 200 may be performed in accordance with the present invention in any of the environments depicted in FIGS. 1-5, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processor, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that the operations of method 200 may be performed in any type of environment in which different configurations may be set and dynamically changed. For example, in some preferred approaches, method 200 is performed within a distributed site environment, and is used to determine which parameters a production machine should tune to in order to enable relatively efficient data mirroring operations within the distributed site environment.

Operation 202 includes defining a fitness function for testing different configurations in a distributed site environment. The process of defining the fitness function, in some preferred approaches, includes a multi-objective optimization problem. For context, in order to achieve multi-objective optimization, the fitness function may incorporate a plurality of individuals. In other words, in one or more of such approaches, the fitness function may, at least in part, be based on Formula (1) below.

$$f(\text{Individual}) = [f_1 \text{ (Individual)}, f_2 \text{ (Individual)} \ ... \ f_N \text{ (Individual)}] \quad \text{Formula (1)}$$

As shown in Formula (2), in some approaches, simple additive weighting may be incorporated into the fitness function, where the variables "λ" represent the weights that are applied to associated individuals.

$$f(\text{Individual}) = \lambda_1 f_1 \text{ (Individual)} + \lambda_2 f_2 \text{ (Individual)} \ ... \ + \lambda_N f_N \text{ (Individual)} \quad \text{Formula (2)}$$

The fitness function may then be defined as:

$$f(\text{Individual}) = \sum_{i=1}^{N} \lambda i \ Indicatori(\text{Individual}) \quad \text{Formula (3)}$$

The value of the indicators is acquired from the test, and the fitness function is as below:

$$f(\text{Individual}) = \sum_{i=1}^{N} \lambda i \ Indicatori \quad \text{Formula (4)}$$

An example of fitness function, in some approaches, includes:

$$f(\text{Individual}) = \lambda_1 \ DataTransferThroughout(\text{Individual}) + \lambda_2 \ RPO(\text{Individual}) + \lambda_3 \ PPRCResponseTime(\text{Individual}) \quad \text{Formula (5)}$$

Note that, in Formula (5), the variable $\lambda_i$ may be determined by the demand of a given business, the historical statistics, the feedback of the method, etc., depending on the approach.

In some approaches, an example of fitness function using values from testing process (normalization) includes:

$$f(\text{Individual}) = \lambda_1 DataTransferThroughout + \lambda_2 RecoveryPointObjective + \lambda_3 ResponseTime \quad \text{Formula (6)}$$

Operation 204 includes generating a configuration table that includes all possible configurations of a system in a test environment. The system may include the infrastructure of the distributed site environment, and the different possible configurations are different possible tuning configurations of the parameters of the infrastructure.

The manner in which the different possible configurations of the system are generated may depend on the approach. For example, in a test environment, different configuration arguments may be chosen, such as, bandwidth paths, volume size, disk type, memory size, etc. In contrast, in a customer site, the configuration table may be generated by including the actual configuration of systems in a customer site. In some other approaches, configuration may be chosen. For example, a controller (which may run or be software that is configured to perform the operations of method 200), in some approaches, chooses the first untested configuration in the configuration table. Moreover, the controller may invoke a configurator to configure the storage servers and copy services of the test environment according to this configuration.

In some approaches, the different possible configurations may be obtained by instructing a production machine to return all possible configurations of the system, by auditing a log that details previously used different possible configurations. Decision 206 includes determining whether the configuration table is empty. For context, performance of a testing process described below includes emptying the configuration table as each of the different possible configurations are tested. Accordingly, in response to a determination that the configuration table is empty (all testing is completed), the method optionally continues to operation 208. In contrast, in response to a determination that the configuration table is not empty, a testing process is performed for each of the configurations of the configuration parameter table, e.g., see operation 210.

Techniques for performing the testing process are described in the sub-operations of the flowchart of FIG. 2B. Looking to FIG. 2B, exemplary sub-operations of performing a testing process for each of the configurations of the configuration parameter table are illustrated in accordance with one embodiment, one or more of which may be used to perform operation 210 of FIG. 2A. However, it should be noted that the sub-operations of FIG. 2B are illustrated in accordance with one embodiment which is in no way intended to limit the invention.

Sub-operation 214 includes choosing a next configuration in the configuration table to test, e.g., a first entry in the configuration table, a second entry in the configuration table, a third entry in the configuration table, etc.

Sub-operation 216 includes initializing a population of a plurality of individuals. For context, each individual of the population includes, e.g., is a collection of, parameter values. In some approaches, at least some, e.g., a subset, and up to all of the parameters may be assigned (at least initially) random values as a part of the initialization of the population, e.g., a random value is assigned to ParameterA, a random value is assigned to ParameterB, . . . , a random value is assigned to ParameterN.

In some approaches, these random values are generated within predefined ranges that are associated with the different parameters, e.g., such as generate a random value of pprcDsoDispatchTimeout. In further examples, a random value within a predefined range of 1-65536 may be assigned to a first parameter, e.g., ParameterA=csmgrSyncGrpLowPriorRankLim: 1-65536. In another example, a random value within a predefined range of 1-65536 may be assigned to a second parameter, e.g., ParameterB=csmgrSyncGrpRankLim: 1-65536. In yet another example, a random value within a predefined range of 0-49152 may be assigned to a third parameter, e.g., ParameterC=fbPprcPortBWCeiling: 0-49152. Based on these types of assignments, a given individual that is made up of these parameters may be represented in vector form, e.g., Individual=[csmgrSyncGrpLowPriorRankLim, csmgrSyncGrpRankLim, fbPprcPortBWCeiling], Individual 11=[7, 320, 4900], Individual 12=[28, 528, 573], Individual 13=[397, 64, 920], etc. Furthermore, a population may be made up of a plurality of individuals, e.g., Population 1=[Individual 11, Individual 12, Individual 13].

The step of initializing the population of the plurality of individuals, in some approaches, includes obtaining domain knowledge that detail parameters and/or configurations that are known to be associated with at least a predetermined performance threshold while under certain conditions, e.g., specific parameters or configurations that are known to perform well under certain conditions. Incorporation of this obtained domain knowledge may be used to improve the relative efficiency and effectiveness of a search that is performed. Accordingly, the domain knowledge may be incorporated into the subset of the parameters. For context, in some approaches, the domain knowledge may include expert knowledge, historical data, constraints, etc.

Sub-operation 218 includes using the fitness function to evaluate a fitness of each of the individuals of the population. The process of using the fitness function to evaluate a fitness of each of the individuals includes choosing a next untested individual, and the controller being configured to invoke the configurator to initiate sessions to log into attached systems or machines to modify every parameter to the specified random value. For example, for the parameter SF1302100ESS01 #cat '/dev/cpss0/fb/poke fbPprcPortBW-Ceiling 0x400', where the fbPprcPortBWCeiling has an initial value of 0xA00, the parameter may be modified to have a new value of 0x1324. In other words, in some approaches, using the fitness function to evaluate a fitness of each of the individuals of the population includes launching a software program (as a software test) that is configured to apply the fitness function to the individuals. Results of the software test include the respective fitness levels of each of the individuals.

Using the fitness function to evaluate a fitness of each of the individuals of the population preferably additionally and/or alternatively includes running a test workload and obtaining indicators. More specifically, the controller may send a command to the tester to initiate the testing process. The test triggers the testing workload according to the configuration. Thereafter, the monitor receives the actual output of the test results, such as, throughput, etc., and sends the output to controller. In some approaches, the output may be caused to be combined by using machine learning techniques to predict the performance of different configurations based on historical data or using simulation to estimate the performance of different configurations.

In order to calculate the fitness of a given individual, in some approaches, the controller calculates the fitness of this individual according to fitness function. A normalization method may, in some approaches, be used to transfer the indicators into a percentage. For example, the fitness of a given individual may be calculated using the formula below.

$$\text{Formula (7)}$$

$$\text{fitness(Individual)} =$$
$$0.2 * DataTransferThroughput + 0.3 * PRO + .5 * ResponseTime$$

An example, of values being added to this formula includes fitness(Individual 1) =

$$0.2 * 80\% + 0.3 * 52\% + 0.5 * 63\% = 0.631.$$

It should be noted that the calculations performed above pertain to a single individual of the population, e.g., Individual 1. Accordingly, in some approaches, subsequent to calculating the fitness of Individual 1, the method may move to the next individual. In some alternate approaches, multiple fitness calculations may be performed at the same time, e.g., concurrently.

A subset of the individuals is selected to be in a parent group, e.g., see sub-operation 220. For context, this selection process includes selecting individuals from the current population to be parents for the "next generation" of individuals. A variety of selection methods may be used here. For example, in some approaches, the selection method is a roulette wheel selection. In another approach, the selection method is a tournament selection. Furthermore, in preferred approaches, the selection process is based on the fitness of the individuals, with fitter individuals having a higher chance of being selected. For example, assuming that three individuals, e.g., Individual 1, Individual 2, and Individual 3, have the following fitness calculations: fitness (Individual1)=0.631, fitness (Individual2)=0.259 and fitness (Individual3)=0.738, Individual 3 has a relatively highest chance of being selected to be in the parent group.

Sub-operation 222 includes creating new individuals by combining information from multiple individuals in the parent group. This sub-operation establishes a crossover between the individuals of the parent group. Creating new individuals, in some approaches, includes combining the information of two parents. This can be done in several ways, such as by swapping values for some of the parameters between the two parents. For example, a new Individual 21=[28, 528, 4900], and a new Individual 22=[7, 320, 573]. Other crossover methods may be used, such as a multi-point crossover method or a mutation operator that incorporates gradient information.

A form of mutation may additionally and/or alternatively be introduced into the method. For example, operation 224 includes introducing small random changes to the combined information of the new individuals and/or the individuals of the initialized population to create new populations each having a plurality of individuals. This sub-operation can help to prevent the algorithm described herein from getting stuck in a local optimum. For example, where Individual 21=[37, 528, 4900] and Individual 22=[7, 320, 592], a Population2=[Individual21, Individual22].

Iterations of the sub-operations described above, e.g., particularly the evaluation of fitness, the selection of parents, the crossover, and the mutation may be repeated for a predetermined number of generations and/or until a satisfactory solution is found, e.g., optimized parameters determined to have at least a predetermined degree of performance are found. This determination is noted in decision 226.

Refined parameters of the configuration, that are determined to be optimal, are stored to a configuration parameter table, e.g., see operation 212 of FIG. 2A. For example, for the configuration examples above, the following parameters may be determined to show the best performance: csmgrSyncGrpLowPriorRankLim=237, csmgrSyncGrpRankLim=350, and fbPprcPortBWCeiling=2890.

However, in response to a determination that none of the refined parameters of the configuration that are determined to be optimal, method 200 optionally includes using the fitness function to reevaluate the fitness of each of the individuals for determining refined parameters of the configuration that are optimal. Note that these optimal parameters may arise based on at least some time passing. For context, in some approaches, method 200 includes triggering a test workload and/or simulated test workload to systems associated with each of the individuals to acquire actual performance indicator results. These actual performance indicator results may then be substituted into the fitness function to calculate the fitness of each of the individuals, in some approaches.

As illustrated by the logical path leading from operation 212, operations of method 200 may be performed for other (a next) configurations of the configuration table, e.g., repeat the configuration, until an end of the configuration table is met. In response to a determination that the end of the configuration table is met, e.g., as illustrated by the "YES" logical path of decision 206, method 200 includes causing the configuration parameter table to be deployed to production, e.g., see operation 208. In some approaches, causing the configuration parameter table to be deployed to production includes causing a production machine to tune to the refined parameters of the configuration parameter table for operations performed within the distributed site environment. These operations performed within the distributed site environment, in some approaches, include data mirroring operations. In some approaches, production machines may find their configurations from configuration parameter table and adjust the real parameters accordingly. Production machines dynamically change parameters if configuration changes. In some other approaches, associated configurations may be determined for the production machines. For example, in some approaches, in response to receiving information from the production machine, method 200 optionally includes using the configuration parameter table to identify the individual associated with the refined parameters that is associated with the received information. An indication of the identified individual may be output to the production machine, where the indication includes instructions for the production machine to tune to refined parameters of the configuration parameter table that are associated with the identified individual.

Various performance benefits are achieved as a result of deploying the techniques and infrastructure described herein. Accordingly, performance of a distributed site environment relatively increases as a result of the techniques described herein being deployed. For example, these benefits include achieving an overall optimization for multiple different parameters, e.g., timeouts, thresholds, settings, etc., which would otherwise have had the potential for conflicting with one another or impacting one another. Furthermore, based on the techniques described herein relying on optimization theory rather than personal experience to determine parameters, the obtained parameters, as a result, ensured to be close to optimal. These parameter optimization management techniques also automatically call tests, speeding up the testing process and reducing manual labor. It should also be noted that this invention can be used to optimize the parameter settings for other systems besides copy services and disaster recovery.

FIG. 3 depicts a parameter list 300, in accordance with one embodiment. As an option, the present parameter list 300 may be implemented in conjunction with features from any other embodiment listed herein, such as those described with reference to the other FIGS. Of course, however, such parameter list 300 and others presented herein may be used in various applications and/or in permutations which may or may not be specifically described in the illustrative embodiments listed herein. Further, the parameter list 300 presented herein may be used in any desired environment.

The parameter list 300 details a plurality of illustrative parameter types, e.g., task timeout values, maximum data transfer group size values, master polling exit percentage values, ranking values, usage values, data recording types, workload accelerator values, data pool thresholds, etc. These parameter types may be incorporated into operations described elsewhere herein, e.g., see method 200.

FIG. 4 depicts a configuration table 400, in accordance with one embodiment. As an option, the present configuration table 400 may be implemented in conjunction with features from any other embodiment listed herein, such as those described with reference to the other FIGS. Of course, however, such configuration table 400 and others presented herein may be used in various applications and/or in permutations which may or may not be specifically described in the illustrative embodiments listed herein. Further, the configuration table 400 presented herein may be used in any desired environment.

The configuration table 400 stores every possible configuration of the systems and environment to be tested. These possible configurations, e.g., for configuration1 and configuration2, have unique bandwidths, volume sizes and disk types, which are detailed in the configuration table 400.

FIG. 5 depicts a configuration parameter table 500, in accordance with one embodiment. As an option, the present configuration parameter table 500 may be implemented in conjunction with features from any other embodiment listed herein, such as those described with reference to the other FIGS. Of course, however, such configuration parameter table 500 and others presented herein may be used in various applications and/or in permutations which may or may not be specifically described in the illustrative embodiments listed herein. Further, the configuration parameter table 500 presented herein may be used in any desired environment.

The configuration parameter table 500 stores the optimal parameter settings for every configuration of the systems and environment. These parameter settings include priority rankings (e.g., see csmgrSyncGrpLowPriorRankLim), ranking limitations (e.g., see csmgrSyncGrpRankLim) and port ceilings (e.g., see fbPprcPortBWCeiling), for different configurations, in addition to the possible configuration of the systems and environment to be tested.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

defining a fitness function for testing different configurations in a distributed site environment;

obtaining all possible configurations of a system in a test environment by instructing a production machine to audit a log that details previously used different possible configurations;

generating a configuration table that includes all the possible configurations of the system in the test environment;

performing a testing process for each of the configurations of the configuration table, wherein the testing process includes:

initializing a population of a plurality of individuals, wherein each of the individuals of the population includes a plurality of random values for a subset of parameters, using the fitness function to evaluate a fitness of each of the individuals, selecting a subset of the individuals to be in a parent group, creating new individuals by combining information from multiple individuals in the parent group, and storing refined parameters of the configuration, that are determined to be optimal, to a configuration parameter table, wherein the refined parameters of the configuration are, in part, determined to be optimal based on use of machine learning that considers historical data, wherein the refined parameters of the configuration are not determined based on personal experience;

causing a production machine to tune to the refined parameters of the configuration parameter table; and performing, subsequent to the tuning to the refined parameters, data mirroring operations within the distributed site environment, wherein a first performance of the distributed site environment subsequent to the tuning to the refined parameters is relatively greater than a second performance of the distributed site environment prior to the tuning to the refined parameters, wherein the first performance and the second performance are measured with respect to a number of timeouts, a number of thresholds, and a number of settings that conflict with one another within the distributed site environment.

2. The CIM of claim 1, comprising: in response to a determination that none of the refined parameters of the configuration that are determined to be optimal, using the fitness function to reevaluate the fitness of each of the individuals; triggering a test workload and/or simulated test workload to systems associated with each of the individuals to acquire actual performance indicator results, wherein the triggering the test workload and/or the simulated test workload comprises using an automated tester tool to call a host server to send the test workload and/or simulated test workload to primary volumes to the systems associated with each of the individuals, wherein the systems associated with each of the individuals are storage systems, wherein the storage systems are configured as a copy services environment that includes replicated copies of data used for failover purposes during a disaster event; and substituting the actual performance indicator results into the fitness function to calculate the fitness of each of the individuals.

3. The CIM of claim 1, wherein operations performed within the distributed site environment are data mirroring operations.

4. The CIM of claim 1, comprising: receiving information from the production machine; using the configuration parameter table to identify the individual that is associated with the received information; and outputting an indication of the identified individual, wherein the indication includes instructions for the production machine to tune to refined parameters of the configuration parameter table that are associated with the identified individual.

5. The CIM of claim 1, wherein the parameters are selected from the group consisting of: task timeout values, maximum data transfer group size values, master polling exit percentage values, ranking values, and data recording types.

6. The CIM of claim 1, wherein initializing the population of the plurality of individuals includes: obtaining domain knowledge that detail parameters and/or configurations that are known to be associated with at least a predetermined performance threshold, and incorporating the domain knowledge into the subset of the parameters.

7. The CIM of claim 6, wherein the domain knowledge is selected from the group consisting of: expert knowledge, the historical data, and constraints.

8. A computer program product (CPP), the CPP comprising:

a set of one or more non-transitory computer-readable storage media; and program instructions, collectively stored in the set of one or more non-transitory storage media, for causing a processor set to perform the following computer operations:

define a fitness function for testing different configurations in a distributed site environment;

obtain all possible configurations of a system in a test environment by instructing a production machine to audit a log that details previously used different possible configurations;

generate a configuration table that includes all the possible configurations of the system in the test environment;

perform a testing process for each of the configurations of the configuration table, wherein the testing process includes:

initializing a population of a plurality of individuals, wherein each of the individuals of the population includes a plurality of random values for a subset of parameters, using the fitness function to evaluate a fitness of each of the individuals;

selecting a subset of the individuals to be in a parent group, creating new individuals by combining information from multiple individuals in the parent group, and storing refined parameters of the configuration, that are determined to be optimal, to a configuration parameter table, wherein the refined parameters of the configuration are, in part, determined to be optimal based on use of machine learning that considers historical data, wherein the refined parameters of the configuration are not determined based on personal experience;

cause a production machine to tune to the refined parameters of the configuration parameter table; and perform, subsequent to the tuning to the refined parameters, data mirroring operations within the distributed site environment, wherein a first performance of the distributed site environment subsequent to the tuning to the refined parameters is relatively greater than a second performance of the distributed site environment prior to the tuning to the refined parameters, wherein the first performance and the second performance are measured with respect to a number of timeouts, a number of thresholds, and a number of settings that conflict with one another within the distributed site environment.

9. The CPP of claim 8, the CPP comprising: program instructions, collectively stored in the set of one or more non-transitory storage media, for causing the processor set to perform the following computer operations: in response to a determination that none of the refined parameters of the configuration that are determined to be optimal, use the fitness function to reevaluate the fitness of each of the individuals; trigger a test workload and/or simulated test workload to systems associated with each of the individuals to acquire actual performance indicator results, wherein the triggering the test workload and/or the simulated test workload comprises using an automated tester tool to call a host server to send the test workload and/or simulated test workload to primary volumes to the systems associated with each of the individuals, wherein the systems associated with each of the individuals are storage systems, wherein the storage systems are configured as a copy services environment that includes replicated copies of data used for failover purposes during a disaster event; and substitute the actual performance indicator results into the fitness function to calculate the fitness of each of the individuals.

10. The CPP of claim 8, wherein operations performed within the distributed site environment are data mirroring operations.

11. The CPP of claim 8, the CPP comprising: program instructions, collectively stored in the set of one or more non-transitory storage media, for causing the processor set to perform the following computer operations: receive information from the production machine; use the configuration parameter table to identify the individual that is associated with the received information; and output an indication of the identified individual, wherein the indication includes instructions for the production machine to tune to refined parameters of the configuration parameter table that are associated with the identified individual.

12. The CPP of claim 8, wherein the parameters are selected from the group consisting of: task timeout values, maximum data transfer group size values, master polling exit percentage values, ranking values, and data recording types.

13. The CPP of claim 8, wherein initializing the population of the plurality of individuals includes: obtaining domain knowledge that detail parameters and/or configurations that are known to be associated with at least a predetermined performance threshold, and incorporating the domain knowledge into the subset of the parameters.

14. The CPP of claim 13, wherein the domain knowledge is selected from the group consisting of: expert knowledge, the historical data and constraints.

15. A computer system (CS), the CS comprising:

a physical processor set;

a set of one or more non-transitory computer-readable storage media; and program instructions, collectively stored in the set of one or more non-transitory storage media, for causing the processor set to perform the following computer operations:

define a fitness function for testing different configurations in a distributed site environment;

obtain all possible configurations of a system in a test environment by instructing a production machine to audit a log that details previously used different possible configurations;

generate a configuration table that includes all the possible configurations of the system in the test environment;

perform a testing process for each of the configurations of the configuration table, wherein the testing process includes:

initializing a population of a plurality of individuals, wherein each of the individuals of the population includes a plurality of random values for a subset of parameters, using the fitness function to evaluate a fitness of each of the individuals, selecting a subset of the individuals to be in a parent group, creating new individuals by combining information from multiple individuals in the parent group, and storing refined parameters of the configuration, that are determined to be optimal, to a configuration parameter table, wherein the refined parameters of the configuration are, in part, determined to be optimal based on use of machine learning that considers historical data, wherein the refined parameters of the configuration are not determined based on personal experience;

cause a production machine to tune to the refined parameters of the configuration parameter table; and perform, subsequent to the tuning to the refined parameters, data mirroring operations within the distributed site environment, wherein a first performance of the distributed site environment subsequent to the tuning to the refined parameters is relatively greater than a second performance of the distributed site environment prior to the tuning to the refined parameters, wherein the first performance and the second performance are measured with respect to a number of timeouts, a number of thresholds, and a number of settings that conflict with one another within the distributed site environment.

16. The CS of claim 15, the CS comprising: program instructions, collectively stored in the set of one or more storage media, for causing the processor set to perform the following computer operations: in response to a determination that none of the refined parameters of the configuration that are determined to be optimal, use the fitness function to reevaluate the fitness of each of the individuals; trigger a test workload and/or simulated test workload to systems associated with each of the individuals to acquire actual performance indicator results, wherein the triggering the test workload and/or the simulated test workload comprises using an automated tester tool to call a host server to send the test workload and/or simulated test workload to primary volumes to the systems associated with each of the individuals, wherein the systems associated with each of the individuals are storage systems, wherein the storage systems are configured as a copy services environment that includes replicated copies of data used for failover purposes during a disaster event; and substitute the actual performance indicator results into the fitness function to calculate the fitness of each of the individuals.

17. The CS of claim 15, wherein operations performed within the distributed site environment are data mirroring operations.

18. The CS of claim 15, the CS comprising: program instructions, collectively stored in the set of one or more storage media, for causing the processor set to perform the following computer operations: receive information from the production machine; use the configuration parameter table to identify the individual that is associated with received information; and output an indication of the identified individual, wherein the indication includes instructions for the production machine to tune to refined parameters of the configuration parameter table that are associated with the identified individual.

19. The CS of claim 15, wherein the parameters are selected from the group consisting of: task timeout values, maximum data transfer group size values, master polling exit percentage values, ranking values, and data recording types.

20. The CS of claim 15, wherein initializing the population of the plurality of individuals includes: obtaining domain knowledge that detail parameters and/or configurations that are known to be associated with at least a predetermined performance threshold, and incorporating the domain knowledge into the subset of the parameters.

* * * * *